Feb. 20, 1968 W. K. BENDER 3,370,133

OPTICAL SOUND-RECORDING APPARATUS

Filed Dec. 11, 1963 8 Sheets-Sheet 1

INVENTOR.
WERNER K. BENDER

BY Hane and Nydick

ATTORNEYS

INVENTOR.
WERNER K. BENDER
BY Hane and Nydick
ATTORNEYS

INVENTOR.
WERNER K. BENDER
BY Hane and Nydick
ATTORNEYS

INVENTOR.
WERNER K. BENDER
BY Hane and Nydick
ATTORNEYS

INVENTOR.
WERNER K. BENDER
BY Hane and Nydick
ATTORNEYS

INVENTOR
WERNER K. BENDER
BY Hane and Nydick
ATTORNEYS

INVENTOR.
WERNER K. BENDER
BY Howe and Nydick
ATTORNEYS

INVENTOR.
WERNER K. BENDER
BY Kane and Nydick
ATTORNEYS 3,370,133

OPTICAL SOUND-RECORDING APPARATUS

Werner K. Bender, Plainville, Conn., assignor to The Kalart Company Inc., Plainville, Conn., a corporation of New York Filed Dec. 11, 1963, Ser. No. 329,702
22 Claims. (Cl. 179—100.3)

The present invention relates to apparatus for optically recording sound tracks on a carrier, such as a strip of light-sensitized film, and more particularly to apparatus for optically recording a sound track, especially a variable density sound track, in the form of a plurality of parallel separate sound track sections on a sound record area of the carrier.

It is a broad object of the invention to provide a novel and improved apparatus for optically recording on a light-sensitized carrier a sectionalized sound track of the general kind above referred to in an economically practical manner.

A more specific object of the invention is to provide a novel and improved recording assemblage with which a recording with low distortion can be effected with a comparatively simple modulator and a low voltage recorder lamp, such as a 40 watt lamp, by utilizing the full speed of the recording lens.

Another more specific object of the invention is to provide a novel and improved sound-recording apparatus of the general kind above referred to in which the carrier during recording is continually rotated about the optical recording assembly of the apparatus while said assembly is being axially displaced in reference to the carrier, and in which the carrier is transported to place another carrier in recording position and the recording assemblage is returned into its starting position upon completion of a sound track to ready the apparatus for the recording of another sound track.

Other and further objects, features and advantages of the invention will be pointed out hereinafter and set forth in the appended claims constituting a part of the application.

In the accompanying drawings a preferred embodiment of the invention is shown by way of illustration, and not by way of limitation.

Figures 1, 2, 3, 4, 5, 6, 9:
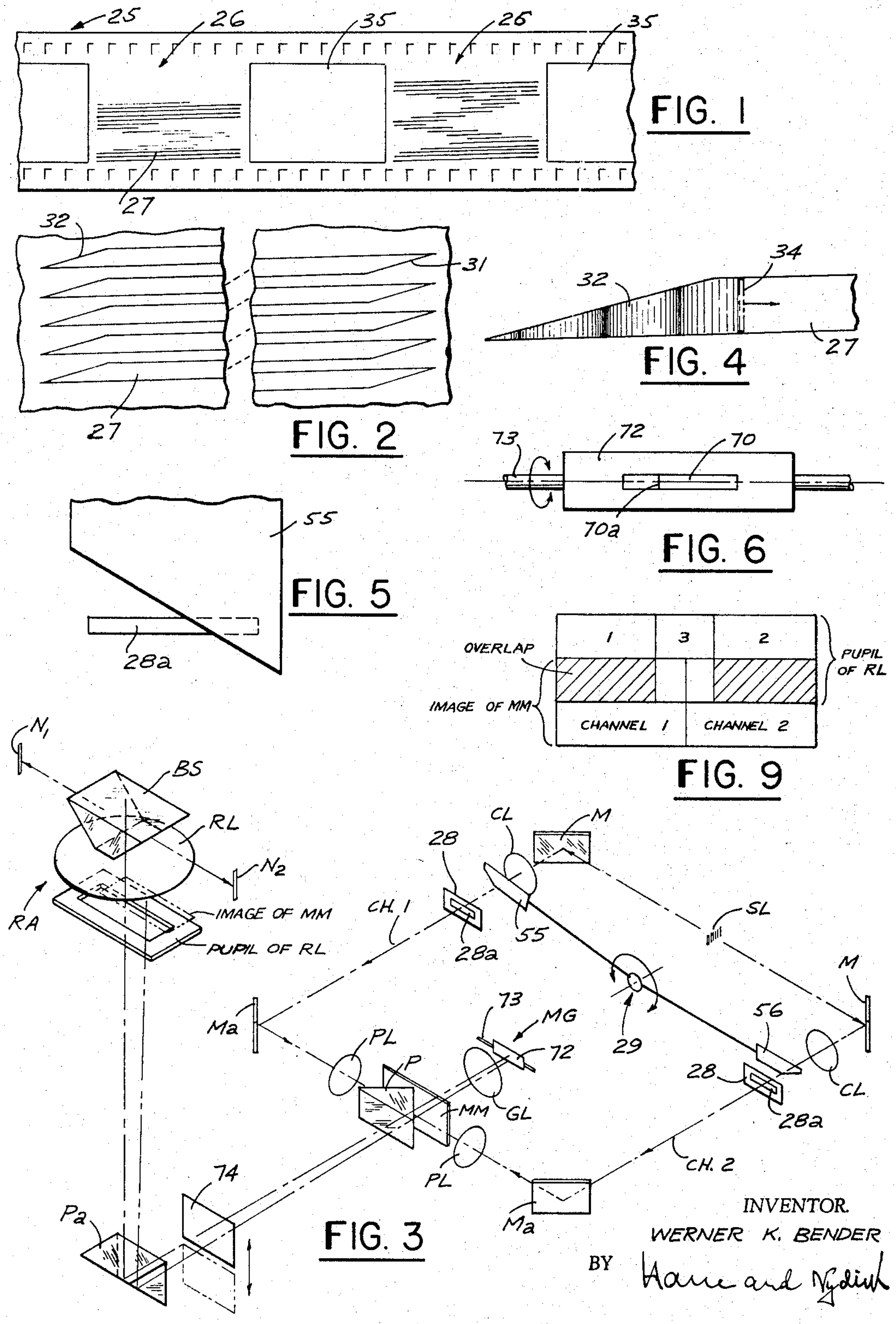
FIG. 1 shows a strip of film bearing sound track areas of the kind to be recorded with the apparatus of the invention.
FIG. 2 is an enlarged view of several sections of the sound track to be recorded.
FIG. 3 is a perspective diagrammatic view of the optical recording assembly of the apparatus according to the invention.
FIG. 4 is an enlarged fragmentary view of one of the sections of the sound track, said view showing the formation of a tapered fade-in end portion of one of the sections of the sound track area.
FIG. 5 shows diagrammatically the function of one of the shutter blades included in the optical recording assembly to form said tapered end portions of the track sections.
FIG. 6 is a diagrammatic view of a modulating galvanometer of the vibrating-mirror type included in the optical recording assembly for modulating the light beam of the apparatus in accordance with the sound to be recorded.
FIG. 9 shows diagrammatically the distribution of the images appearing on the recording lens of the optical recording assembly.

Referring first to FIGS. 1 and 2, FIG. 2 shows a strip of film 25, such as standard 35 mm. motion picture film. The film has printed thereon alternate sound record areas 26 and picture areas 35. The type of picture areas is not essential for the understanding of the invention, and hence no further reference will be made to the same. It should only be noted that each picture area is associated with a sound track area, in that the sound recorded on a sound record area constitutes an explanatory or otherwise pertinent message relating to the associated picture area. In other words, each picture area and the associated sound record area constitute a program. While the second record areas and the picture areas are shown in longitudinally spaced relationship, a sound record area and a picture area may also be superimposed.

The sound track recorded on each sound record area 26 is an optically recorded track, especially a variable density track. The track is sectionalized; that is, the total length of the track is divided into a plurality of parallel separate track sections 27, as shown in detail in FIG. 2. The recording of the track sections, as will be more fully described hereinafter, starts preferably with the lowermost track section, as shown in FIG. 2, proceeding from left to right, and then again from left to right for the next higher track section, and so on. The track sections, when successively scanned from left to right, starting with the lowermost track section, will reproduce a continuous message. As is indicated in FIG. 1, the track sections may or may not occupy the entire available sound track area 26.

The track sections extend generally lengthwise of film 25, but are slightly upwardly slanted. The angle of slant is such that when the film is bent into a cylindrical configuration, the sound track sections constitute a continuous helical sound track having a pitch of 1/80 inch. Another suitable pitch may of course be selected, but it has been found that a pitch of 1/80 inch can be conveniently and economically produced.

As appears from the foregoing description, the scanning beam of the projector, upon completion of each track section, must return from the end of one track section to the beginning of the next following higher track section. To prevent, or at least to reduce, an audible click during the transition from one track section to the next following one, a fade-out portion 31 and a fade-in portion 32 are provided at the ends of each track section. As is clearly shown in FIG. 2, these fade-out and fade-in portions are in the form of tapers which complement each other, so that when the track sections are scanned with a slight overlapping of each two track sections, the scanning beam will in effect always scan the full width of the track sections, which is consistent with a variable density recording.

Turning now to FIGS. 3–8, the diagram of FIG. 3 shows a source of light SL, such as an incandescent lamp having a tungsten ribbon filament. This filament is imaged by a light-deviating means, such as mirror system M and condenser lens CL, upon masks 28, each having a slot 28*a*. The light incident upon the masks fills the slots thereof completely, thus shaping the two images to predetermined dimensions and a generally rectangular configuration. An obturator or shutter 55, 56 is interposed in the light beam close to the respective mask 28. The shutter blades are wedge-shaped (FIG. 5) and are alternately raised and lowered by a suitable mechanism, as is indicated at 29 and as will be more fully described hereinafter. As a result, the two light beams 1 and 2 emanating from the slots 28*a* of the masks are alternately intercepted, and the tapered end portions 31 and 32, respectively, are defined. The two channels 1 and 2 are deflected by further light-deviating means, such as mirror systems M*a*. Slots 28*a* are imaged by projecting lens PL, a beam-merging light-deviating means, such as a triangular prism P, a modulating mask MM and a condenser lens GL upon the vibrating oscillating mirror 72 of a conventional sound-modulating galvanometer MG. Mask MM is stationary and is formed with a triangular slot, as is clearly shown in FIG. 3. Mirror 72 vibrates about or with a shaft 73 driven by a conventional and suitable means. The vibrations of the mirror are controlled in a conventional and suitable manner by transducing means in accordance with the sound to be recorded.

As the two channels are alternately intercepted by shutter blades 55 and 56, only one image 70 appears to be present on the mirror. Due to the gradual opening of shutter 55 and the corresponding gradual closing of shutter 56, and vice versa, the two images of channels 1 and 2 blend into each other and form the aforementioned single apparent image. The total length of the image 70 shown in FIG. 6 represents the width of the sound track to be recorded, and the line 70*a* constitutes the dividing line between the two images that are actually present. As is evident, line 70*a* will be shifted to the left or right in accordance with the opening and closing movements of the shutters. This shifting of the line causes the formation of the tapered ends of track sections 27, as defined by the wedge angle of the shutter blades.

The vibrations of mirror 72 are so slanted that the combined apparent image 70 is reflected past prism P upon a light-deviating means, such as a prism P*a*. A cut-off shutter 74 may be interposed between prisms P and P*a* to prevent fogging of the film on which the recording is to be effected during the time intervals between the recording of successive sound track areas, as will be more fully explained hereinafter. The shutter is shown in full lines in its cut-off position and in dotted lines in its recording position.

Prism P*a* directs the vibrating composition image of P reflected by galvanometer mirror 72 upon the pupil of recording lens RL, thus modulating the flux of light. The light incident upon mask MM and representing the aforedescribed composite image will vibrate in reference to the slot thereof, whereby continually varying portions of the light will be cut off. FIG. 3 indicates in dotted lines one of the possible positions of the light beam in reference to the slot of the mask forming the pupil of lens RL. In other words, the mask effects a quantitative control of the light reaching recording lens RL and beam splitter BS.

Figures 7, 8, 10:
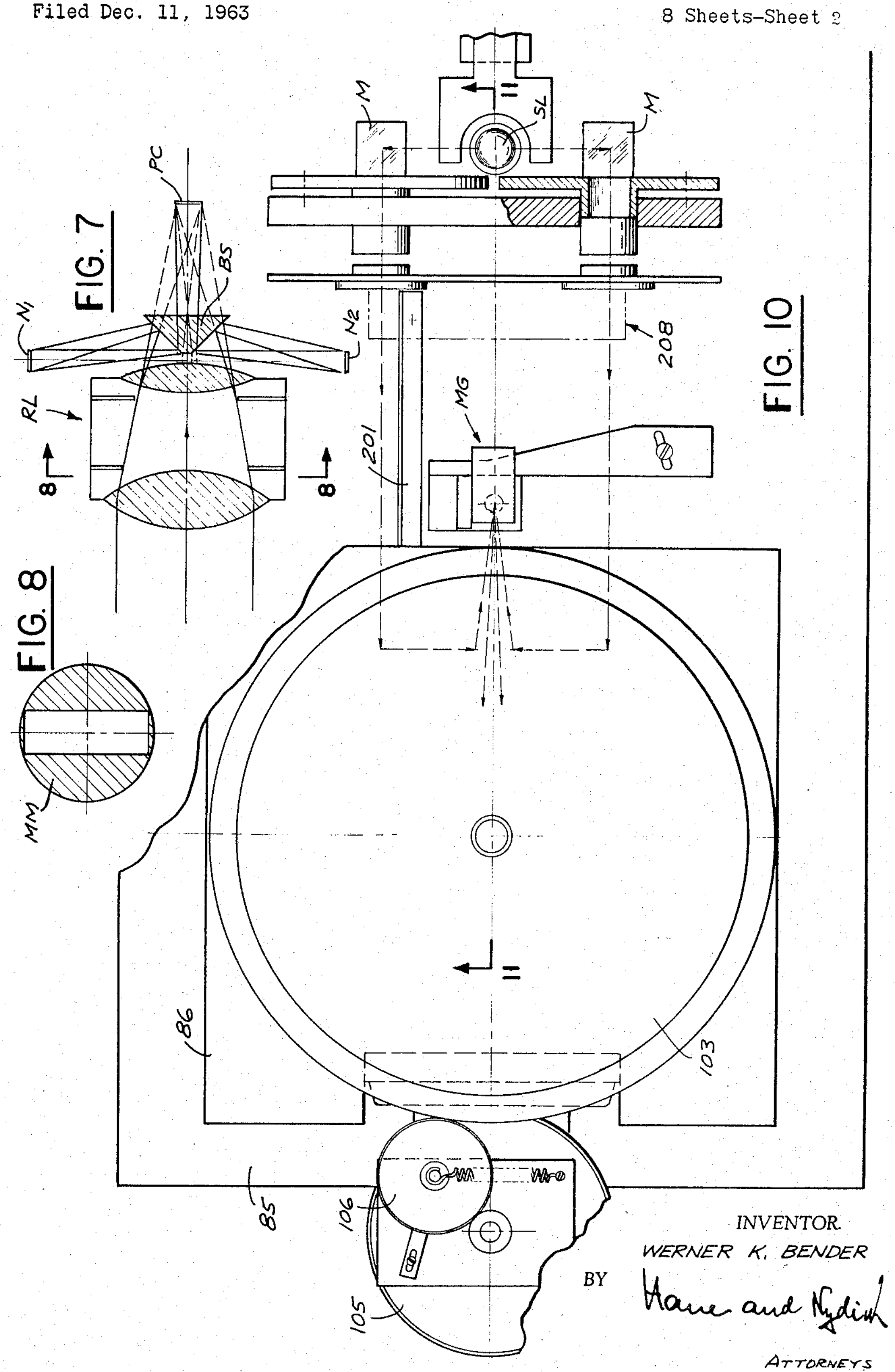
FIG. 7 shows diagrammatically the recording lens of the optical recording assembly and the optical components directly associated with the recording lens.
FIG. 8 is a section taken on line 8—8 of FIG. 7.
FIG. 10 is a plan view of the apparatus, the top cover of the apparatus being in place.

The negative film N upon which the parallel track sections described in connection with FIG. 1 are to be recorded is mounted upon a rotary drum rotating coaxially with the optical center axis of the recording lens RL and the beam splitter, as will be more fully described hereinafter. At this point it should only be mentioned that the film, which may be black and white film or color film, is continually rotated about the recording assembly, including the apertured mask, the recording lens and the beam splitter, while the assembly is being axially displaced in reference to the film at a predetermined rate of speed. FIGS. 3 and 7 show two fractional peripheral areas $N_1$ and $N_2$ at the moment of recording thereon.

The beam splitter BS divides the composite image incident upon it from the exit side of the pupil of the recording lens RL and directs one image part with a 90° deflection upon film area $N_1$ and the other part with a 90° deflection upon film area $N_2$, thereby continuously recording successive track sections on the rotationally and coaxially displaced film N.

The beam splitter is disposed closely adjacent the posterior surface of recording lens RL. The slot of the mask, which represents pupil RL, masks the pupil of the lens and may have a ratio of 1:3 or 1:2.5. The slot is shown most clearly in FIG. 8.

The pupil is optically divided by the beam splitter into three sections, which are schematically shown in FIG. 7. One outer section receives the light image for film area $N_1$, and the other outer section, the light image for film area $N_2$. The light impinging upon the midsection of the beam splitter passes the same and may be directed to a monitoring assembly including a photocell PC, as is indicated in FIG. 7. Monitoring assemblies of this kind are well known in the art, and a detailed description thereof is not necessary for the understanding of the invention. To effect the afore-described distribution of the light, the beam splitter is in the form of a truncated prism. The two sides of the prism which intersect at an angle of 90° are used as mirrors and are silvered for that purpose to effect the afore-described deflections of the light images. The two parallel surfaces of the prism pass the light without deflection to the monitoring photocell.

Turning now to the structure of the exemplified recording apparatus as shown in FIGS. 10–19, the apparatus comprises a base 85 which supports platform 86 mounted stationarily on the base by any suitable means, such as legs 87. The platform in turn supports a bushing 88 releasably secured to it by suitable fastening means, such as bolts 89. The bushing seats an upper bearing 90 and a lower bearing 91. These bearings in turn seat a rotating deck assembly 92.

Figure 13:
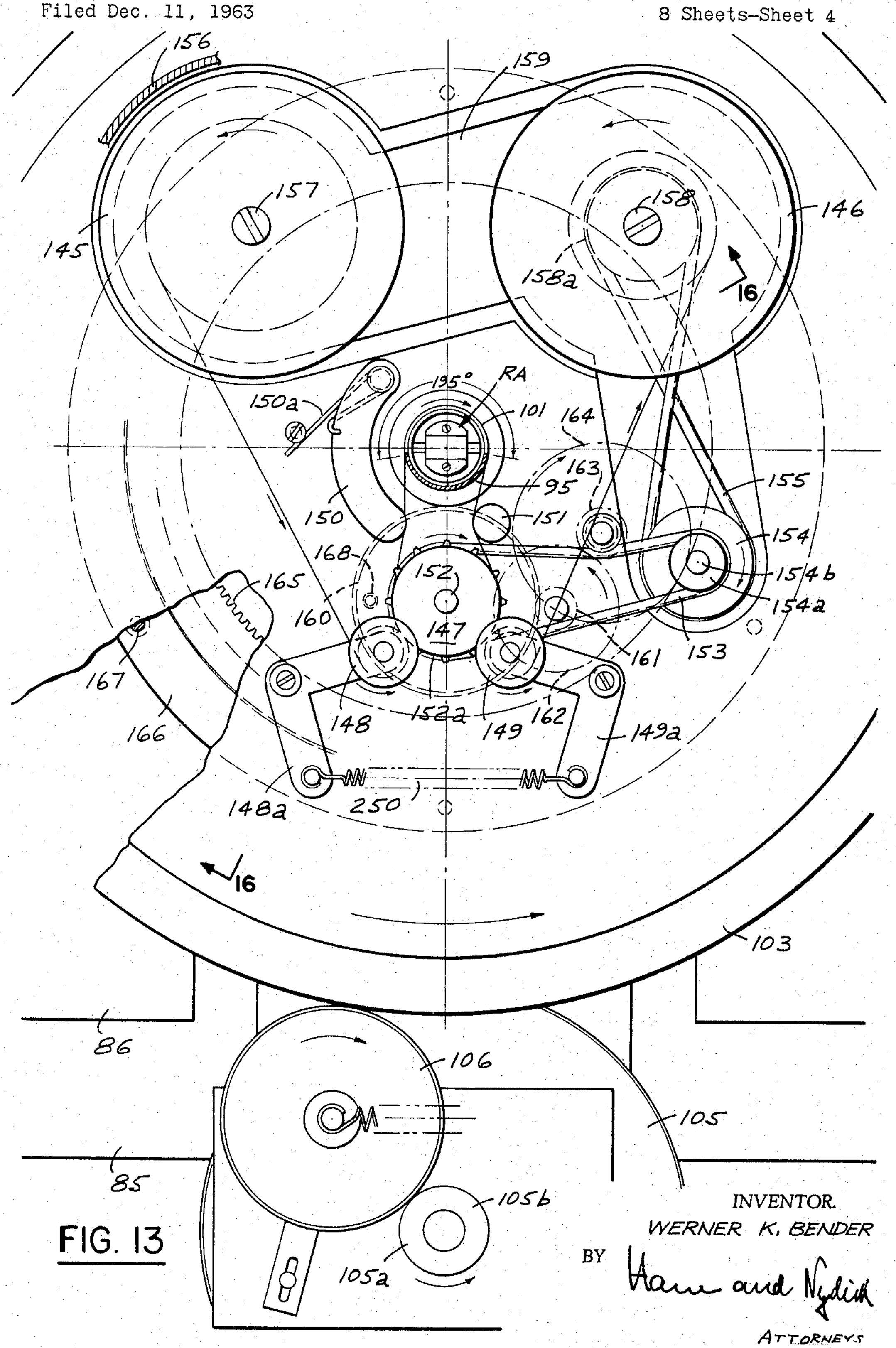
FIG. 13 is an enlarged section taken on line 13—13 of FIG. 11, certain of the components of the apparatus being shown in phantom for the sake of clarity of illustration.
Figures 16, 17:
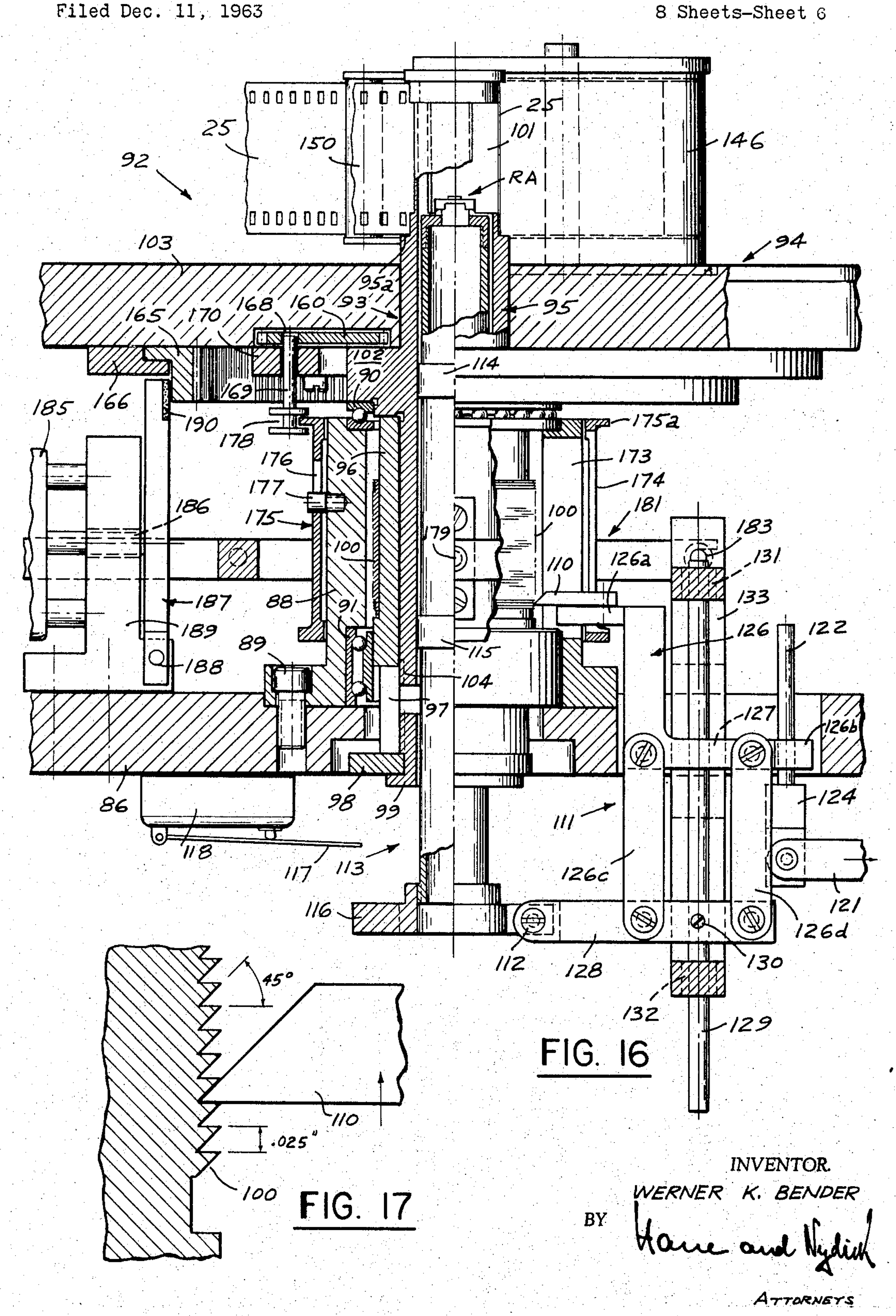
FIG. 16 is an enlarged sectional view of FIG. 11 turned through an angle.
FIG. 17 is an enlarged detail view of FIG. 16.

The deck assembly comprises a subassembly 93 and a subassembly 94, as can best be seen in FIG. 16. Subassembly 93 is secured to subassembly 94. The former includes a machined tube 95, a bushing 96 in which said tube is seated, a spacer sleeve 97, a cam 98, a collar 99 locking the cam to the spacer sleeve 97, and a sleeve 100 secured upon bushing 96 and threaded on the outside. The upper end of sleeve 95 protrudes from a deck plate 103 which constitutes part of subassembly 94. The protruding portion of tube 95 is cut open to form a slot extending through an angle of about 195°, as is shown in FIG. 13. The cut-out in tube 95 serves to receive the film, as will be more fully described hereinafter. The tube 95 is shouldered at 95*a* to guide the film. A portion of tube 95 just below deck plate 103 is flanged at 102 and is bolted or otherwise secured to deck plate 103. The flanged section 102 serves as a support for the afore-mentioned bearing 90. The lower end of tube 95 adjacent stationary deck plate 86 is externally threaded at 104. The camming surface of cam 98 is adjusted in reference to the location of cut-out 101 in tube 95 and is then permanently locked in position by tightening collar 99.

A motor 105 (see FIG. 13), which is mounted on one of the legs 87, drives deck plate 103 of subassembly 94. The drive shaft 105*a* of the motor seats a capstan 105*b* in driving engagement with a spring-loaded idler 106. This idler in turn is in frictional driving engagement with the rim of deck plate 103. The deck plate 103 is secured to tube 95, which in turn is secured to sleeve 96, spacer sleeve 97, cam 98, collar 99 and threaded sleeve 100. Accordingly, rotation of deck plate 103 by motor 105, as described, will cause rotation of tube 95 and all the afore-listed parts secured thereto in reference to bushing 88, which is secured to deck plate 86. Motor 105 is preferably a synchronous motor, and deck plate 103 is preferably a heavy and large disk so that it operates in the manner of a flywheel. As is evident, all gears are eliminated for the rotational movement of the film. Such elimination of gears in conjunction with the flywheel action of plate 103 assures a constant rate of rotation of the film during recording.

Figures 11, 12:
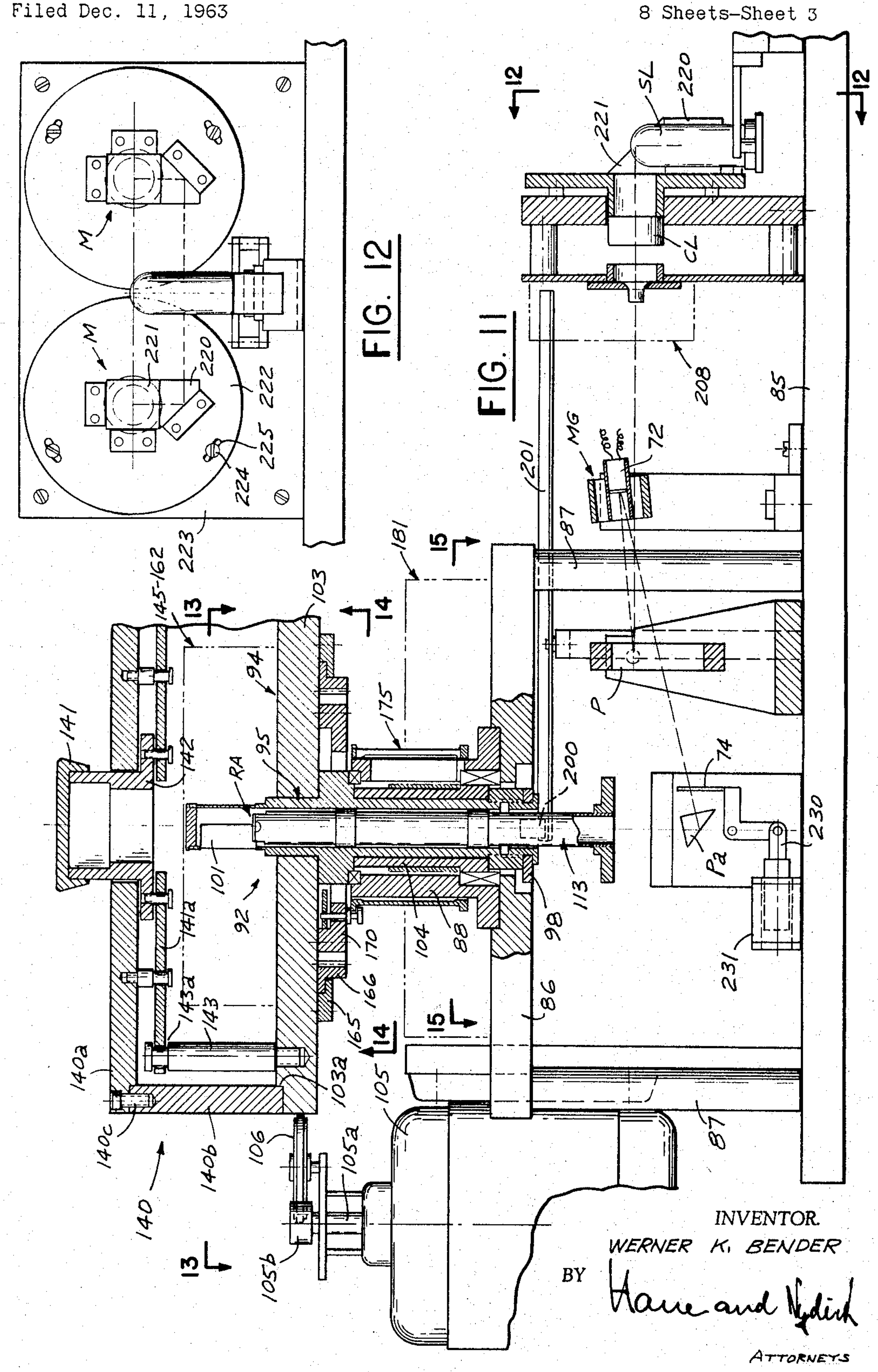
FIG. 11 is a section taken on line 11—11 of FIG. 10.
FIG. 12 is a section taken on line 12—12 of FIG. 11.

Tube 95, or more specifically, the threaded sleeve 100 secured to the tube by means of the intermediate sleeve 96, coacts with a pawl 110 of a linkage 111. The linkage mounts a lens tube assembly 113, which is slidable lengthwise in tube 95 without participating in the rotation thereof and is guided for this purpose in two bearing surfaces 114 and 115. The upper end of tube assembly 113 is above the top side of rotary deck plate 103 and mounts the recording assembly RA and beam splitter BS, as described in connection with FIG. 3. As can best be seen in FIG. 11, light is directed into the lens tube assembly in the manner explained in detail in connection with FIG. 3. As is shown in FIG. 11, lamp SL is mounted on base plate 85 and directs light to two mirror assemblies M. These mirror assemblies are shown in detail in FIG. 12. They receive the light from a first mirror 220 and direct it to a second mirror 221. The mirror assembly is mounted on a support plate 222, which in turn is secured to a support frame 223 by any suitable means, such as a set screw 224 engaging an elongated slot to permit fine adjustment of the mirror assembly. The light beams reflected by the mirror assemblies are directed through the optical components described in connection with FIG. 3 and designated by the same reference characters in FIG. 11. The prism P*a* of the optical assembly is shown in FIG. 11 as being stationarily mounted. There is shown a shutter 74 coupled to a linkage 230. The shutter linkage is actuated by means of a solenoid 231, the energization of which will be subsequently described.

As previously mentioned, pawl 110 of linkage 111 engages the teeth of sleeve 100. These teeth are shown in detail in FIG. 17. The threads on the sleeve are left-hand threads, provided deck plate 103 is rotated in the direction indicated by the arrow in FIG. 13. The number of threads on sleeve 100 depends upon the spacing of track section 27 to be recorded. Forty threads per inch have been found to be suitable. Linkage 111 comprises a control link 121 pivoted to a rod 122 supported by an arm 124 which is pivotal about a pivot 125 on deck plate 86 (see FIG. 15). Rod 122 is slidably extended through a bore in a bellcrank lever 126. Arm **126*a* of lever 126 mounts pawl 110, and arm 126*b* includes an elongated slot 127 to permit pivotal displacement of the linkage system sufficient to move pawl 110 into and out of engagement with the teeth of sleeve 100. Lever 126 is coupled by a parallelogram of levers 126*c* and 126*d* to an arm 128, which in turn is pinned at 130 to slide rods 129. Rods 129 (only one rod is shown) are guided, slidable lengthwise, in bearings 131 and 132, which are mounted in turn on a support 133. Arm 128 is linked to a collar 116 of the tube assembly at 112**.

As is now evident, rotation of sleeve 100 jointly with tube 95 and deck plate 103 will cause the tube assembly 113 and the linkage to rid upwardly in reference to tube 95 when pawl 110 is engaged with the teeth of sleeve 100. The position of the pawl is controlled by link 121, which in turn is controlled by the state of energization of a solenoid 120 (see FIG. 15). The energizing circuit for solenoid 120 is controlled jointly with the energizing circuit for solenoid 231, as will be more fully described hereinafter.

As described in connection with FIG. 3, displacement of the tube assembly in an upward direction in reference to negative film N received in the cut-out portion 101 of rotary tube 95 will cause the required successive recording of sound track sections 27 on the film. As is evident, the recording light spots move on the film along a helical line. The extent of the rise of the tube assembly in reference to the film depends upon the length of the message to be recorded on the sound record area on which recording is in progress. Upon completion of the recording, solenoids 120 and 231 are operated by controlling the energizing circuit therefor by actuating a suitably arranged manual switch (not shown). As a result, pawl 110 will become disengaged, causing the recording assembly to return to its starting position, by gravity or a suitable return spring, and to cut off the light beam from the tube assembly. At the same time, the film transport, to be described later on, may be activated to move the negative film N into position for the recording of the next sound record area.

As appears from the previous explanation, the completion of a recording does not necessarily coincide with the upper limit position of the recording assembly, since the message to be recorded may occupy only part of the available sound record area. The recording assembly will continue its rise, unless shut off upon completion of the recording. Such continued rise may result in damage to the equipment, unless the assembly is shut off when it reaches the provided upper limit position, and such timely shut-off requires the presence of an attendant. To make the continuous presence of an attendant unnecessary, a miniature switch 118 may be provided, as shown in FIG. 16. The arm 117 of this switch will be engaged by a collar 116 on tube 113 when the recording assembly is in the upper limit position, thus automatically causing the return of the recording assembly into its starting position. Switch 118 may also automatically initiate the film transport by controlling solenoid 231. If desired, the continued rise of the recording assembly beyond the completion of the message proper to be recorded may be utilized to record background fill-in music on the part of the sound record area left vacant after recording of a voice message.

The recording operation proper is performed above rotary deck plate 103. As has already been explained, the recording assembly RA supported by axially displaceable tube 113 protrudes above deck plate 103, and the negative film N is received in the cut-out 101 of tube 95 and is rotatable about tube 113. The film is protected against light and dust by a cover 140 having a top wall **140*a* and a side wall 140*b*. The top wall is secured to the side wall by any suitable means, such as bolts 140*c*. The cover is fitted with its side wall in a shoulder 103*a* on the top side of deck plate 103 and is secured to the deck plate by releasable lock means, shown as one or several posts 143, each having a circumferential groove 143*a* engageable with noses 141*a* on a knob 141 rotatably fitted in the top wall 140*a* of cover 140. Knob 141 serves a triple function, namely, as a handle, as an actuator for the lock and as an actuator for the film magazines. The noses 141*a* will engage grooves 143*a* in one rotational position of the knob to lock the cover and to open the film magazines 145, 146**, and are disengaged in another rotational position to release the cover and to close the film magazines.

As can best be seen in FIG. 13, film N is threaded from a supply reel 145 to a take-up reel 146 during recording. The reels are seated on spindles 157 and 158. The spindle 157 for the supply reel is smooth, while the spindle 158 is keyed or otherwise secured to the take-up reel. The entire reel assembly is fitted in a cartridge 156, which is secured in position when the reels are slipped upon spindles 157 and 158 and is seated in a recess 159 formed in deck plate 103.

Rotation of take-up reel 146—that is, transport of the film—is derived from a transport sprocket 147. This sprocket coacts with idlers 148 and 149. The path of the film, when the film is threaded into the apparatus and is traveling from the supply reel to the take-up reel, is clearly shown in FIG. 13. As may be noted, the film travels from supply reel 145 about idler 148, between the idler and transport sprocket 147, past a slack take-up 150 which is spring-loaded by a suitable means, shown as a spring 150_a_, about tube 95 to be exposed to the recording assembly RA by means of cut-out 101 in tube 95, past an idler 151, between transport sprocket 147 and idler 149 to take-up reel 146. The two idlers 148 and 149 are each mounted on a pivotally supported lever 148_a_ and 149_a_, respectively, and are spring-loaded by means of a spring 250.

Transport sprocket 147 is secured on a shaft 152, which also seats a pulley 152_a_. This pulley constitutes part of the transmission means by which sprocket 147 is drivingly coupled with take-up spindle 158. The transmission means further comprise a belt 153 seated upon pulley 152_a_ and a pulley 154_a_. The latter pulley is seated upon a shaft 154_b_ which also seats a step-up pulley 154. The last-mentioned pulley is coupled by a belt 155 to a pulley 158_a_ secured to spindle 158 below the take-up reel 146.

Shaft 152 further seats a gear 160. This gear constitutes the driven gear of a gear train including a pinion 161, a gear 162, a pinion 163, a gear 164, and a gear ring 165 which constitutes the driving gear of the gear train. The ring gear is retained in a bearing ring 166, which is secured to the bottom side of deck plate 103 by suitable fastening means, such as bolts 167. Gear 160 has a transverse bore 168, which in one angular position of the gear is engageable with a locking pin 169 slidable lengthwise in a guide block 170 (see FIG. 16). As is now evident, engagement of pin 169 with bore 168 in gear 160 will lock the entire gear train, and accordingly, sprocket 147 cannot rotate in reference to the rotary assembly 92 including the film-guiding tube 95 and deck plate 103, but will rotate jointly with tube 95 and deck plate 103 in reference to the recording assembly RA mounted on tube 113. As is also evident from the previous disclosure, such rotation of the film about the recording assembly is necessary during the recording of a sound record area and the upward movement of tube 113 and the recording assembly in reference to the film by means of the afore-described action of linkage 111, and more specifically of pawl 110 thereof. The general location of the assembly shown in FIG. 13 in detail is indicated in dotted lines in FIG. 11.

To effect transport of the film through a predetermined distance upon completion of a recording, a sleeve 175 is slidably fitted upon bushing 88. The sleeve is formed with a lengthwise slot 176 through which a set screw 177 is screwed into bushing 88 to permit a limited lengthwise displacement of sleeve 175 in reference to bushing 88, and also to maintain in alignment clearance slots 173 and 174 in bushing 88 and sleeve 175, respectively, for pawl 110 and arm or link 126, respectively. The upper rim of sleeve 175 is formed with an outwardly extending circumferential flange 175_a_ engageable with a collar 178 at the lower end of pin 169. The length and location of slot 176 are such that when sleeve 175 is pulled from its upper limit position, shown in FIG. 16, into or substantially into its lower limit position, gear 160, and with it the transmission means associated therewith, will be released from deck plate 103 and the film-supporting tube 95, and thus will be free to transport the film in reference to the recording assembly mounted in tube 113.

Figures 14, 15:
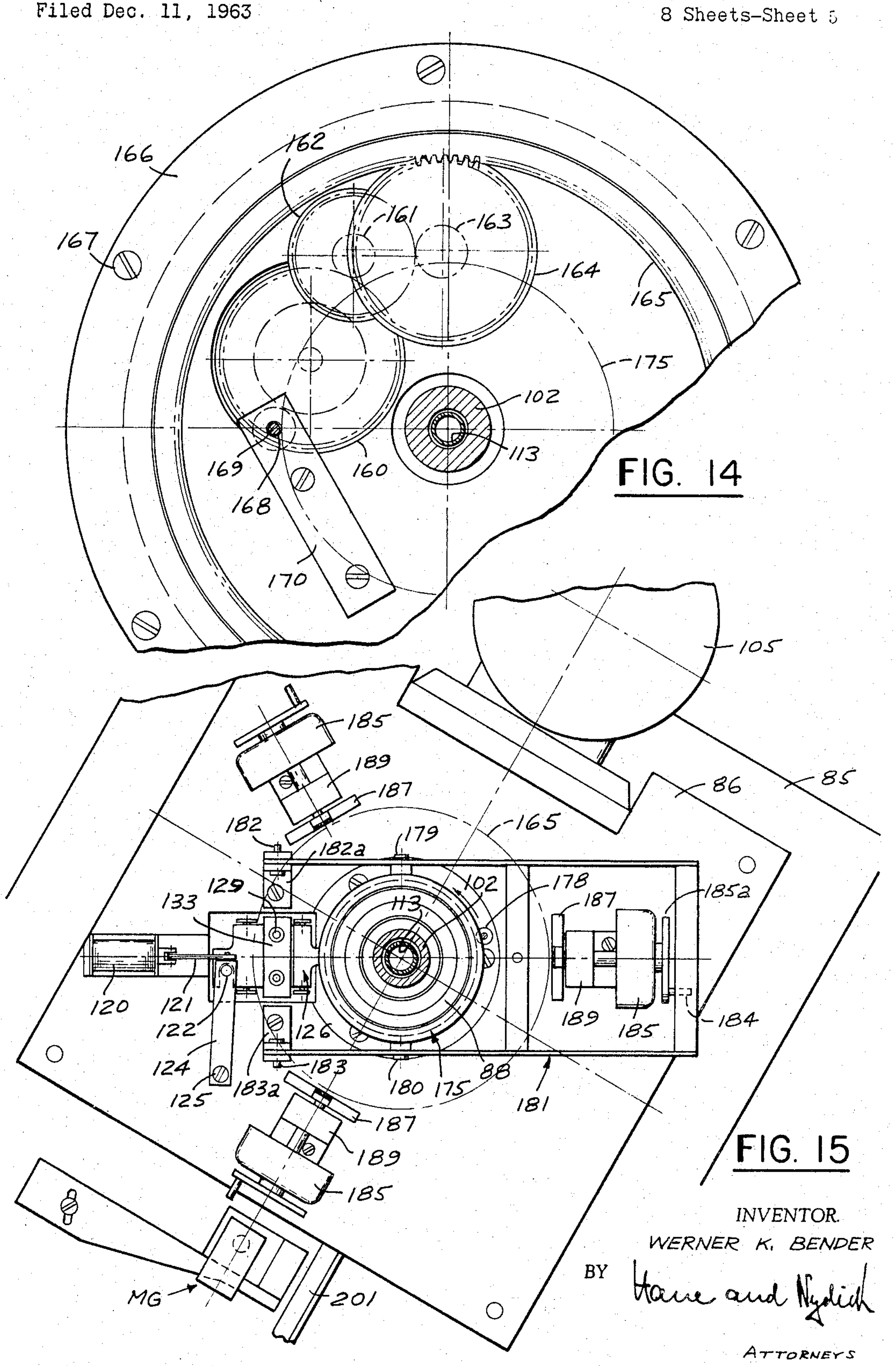
FIG. 14 is an enlarged section taken on line 14—14 of FIG. 11.
FIG. 15 is an enlarged sectional view taken on line 15—15 of FIG. 11.

To control such release of the film transport means at the end of a recording, a lever assembly 181 is mounted on support studs 179, 180 secured in turn on sleeve 175, as shown in FIGS. 15 and 16. Lever assembly 181 comprises a frame 181_a_ pivotally supported at one end at 182 and 183 on brackets 182_a_ and 183_a_, and when depressed, actuates a switch which energizes solenoids 185. The armature of each solenoid, when attracted, performs a slight rotary motion, usually by means of ball-bearing cams, and also a slight lengthwise movement. Solenoids of this kind are well known in the art. This lengthwise movement is utilized to cause the inner end 186 of the respective armature to abut against a brake arm 187, which is pivotal at 188 and may be mounted on a support 189, also supporting the respective rotary solenoid 185. Each brake arm 187 normally is biased, for instance, by means of a suitable spring, into a position in which it just clears ring gear 165. However, when solenoids 185 are energized, the brake arms will be forced into braking engagement with ring gear 165 by the aforementioned slight lengthwise movement of the armatures of the solenoids. To render the braking action by arms 187 more effective, a brake lining may be provided. As can best be seen in FIG. 15, three braking assemblies, each including one of the solenoids 185 and a brake arm 187, are provided, but of course a smaller or greater number of brake assemblies may also be used.

To facilitate the understanding of the location of the components shown in detail in FIG. 13 in the general assembly shown in FIG. 11, a dotted area has been marked in FIG. 11 and designated 145–162 to indicate the location of these components and the components directly associated therewith. Similarly, a dotted area designated 181 is shown in FIG. 11 to designate the location of the components shown in detail in FIG. 15.

The control of solenoids 185 may be effected by the manual switch described in connection with the operation of solenoids 120 and 231. The control of the solenoids may of course also be automatically effected by including the solenoids 185 in the circuit controlled by miniature switch 118.

Energization of the solenoids will cause a downward displacement of sleeve 175 due to the rotary motion of the armatures of the solenoids, which motion will be transmitted by stud 184 to the lever assembly 181 pivotal about pivot points 182 and 183. Such downward movement will free gear 160, as previously explained. In addition, the movement of the anchor will couple the aforementioned gear train in force-transmitting engagement with deck plate 103.

As a result, rotation of motor 105 will now cause transport of the film. The solenoids 185 are de-energized in time to release sleeve 175 and to permit reentry of pin 169 into bore 168 of gear 160 when the latter has completed a predetermined rotation. A new sound record area on film N will now be in exact registry for recording.

Figures 18, 19:
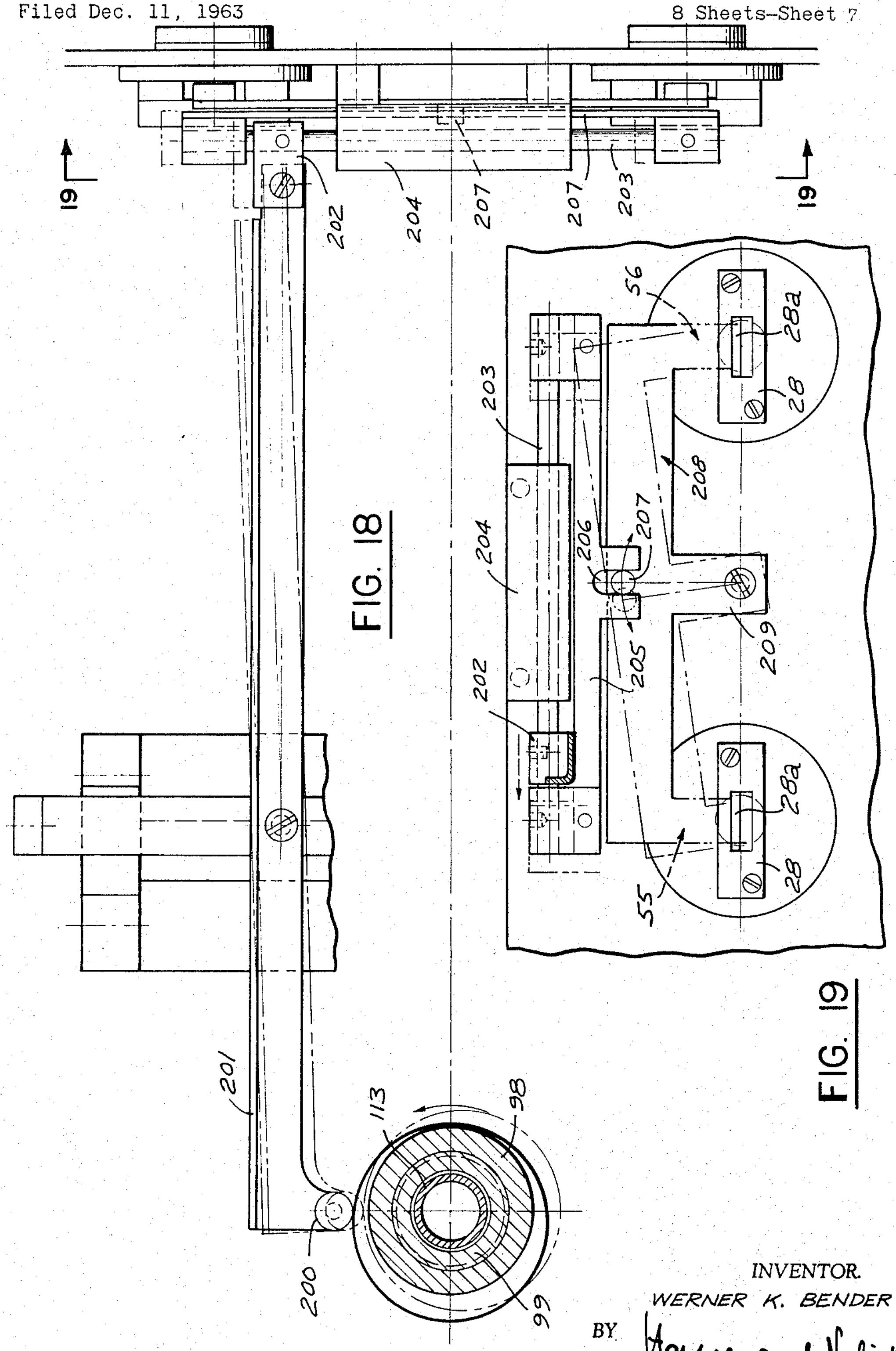
FIG. 18 is a plan view, partly in section, of the shutter mechanism included in the optical recording assembly of the apparatus.
FIG. 19 is a section taken on line 19—19 of FIG. 18.

The mechanism for controlling the alternate opening and closing movements of obturators or shutters 55 and 56, described in principle in connection with FIG. 3, is shown in detail in FIGS. 18 and 19. The location of the shutter assembly shown in these figures is evident from FIG. 11, in which the mechanism is only diagrammatically illustrated, for the sake of clarity of illustration.

Control cam 98 of the shutter assembly is secured to sleeve 97, which in turn is threaded upon tube 95 and rotates jointly with the latter (see FIG. 16). Cam 98 coacts with a cam follower 200 mounted on an arm 201 pivotally linked to a block 202. The block is secured to a rod 203, which is slidable in a bearing 204. The rod 203 mounts a plate 205 including a notch 206 engageable with a stud 207. This stud is provided on a rocker assembly generally designated 208. As shown in FIGS. 18 and 19, the rocker assembly comprises a center pivot arm 209 the branches of which mount the afore-described shutter assemblies 55 and 56. The function of these shutter assemblies has been described in principle in connection with FIGS. 2 and 6.

As previously explained, one of the purposes of the shutter assemblies is to produce the tapers or cut-offs 31 and 32, respectively, at the ends of each track section 27.

Figures 20, 21, 22, 23:
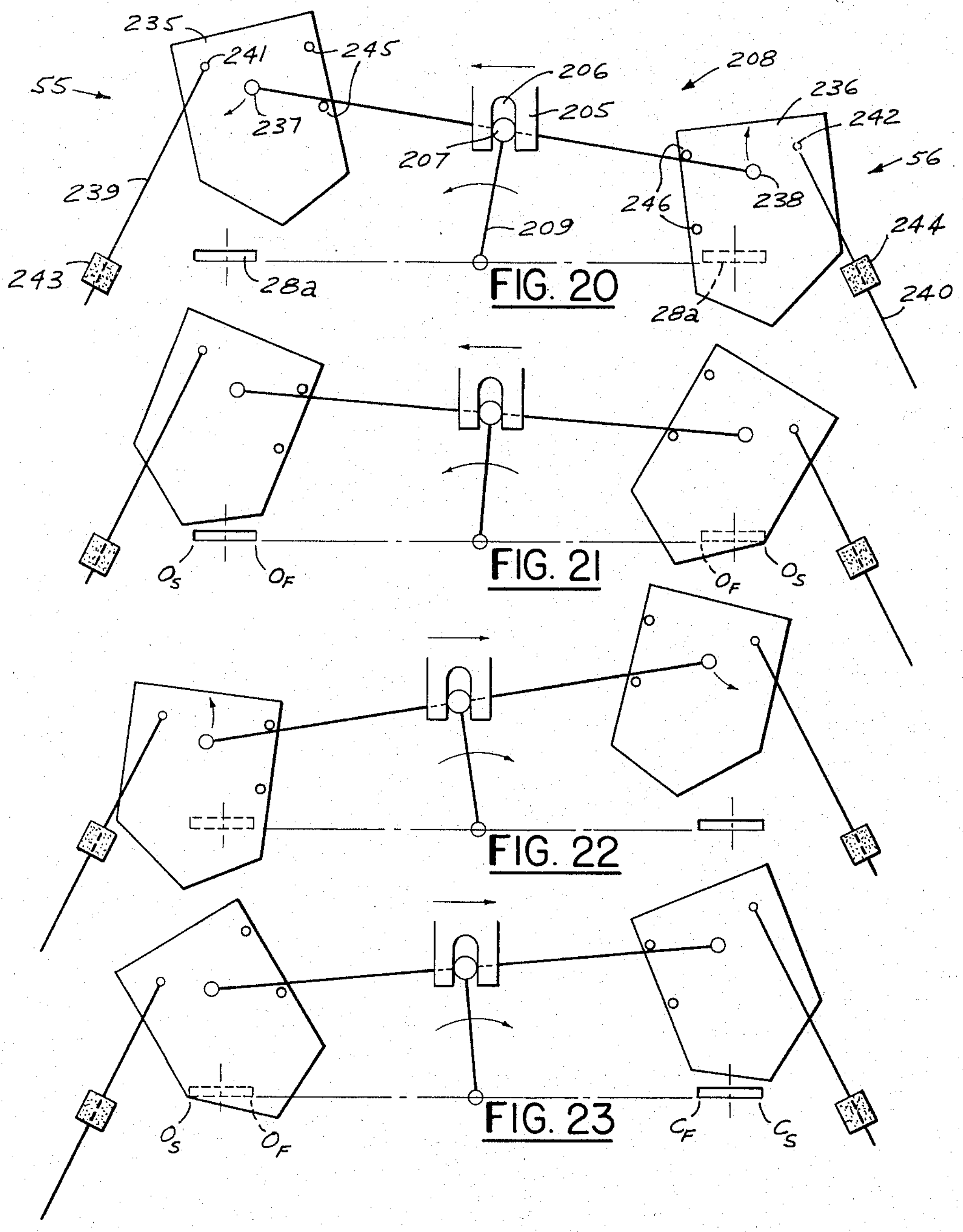
FIGS. 20 through 23 are schematic representations of the shutter mechanism showing four positions of its continuous operation.
Figure 24:
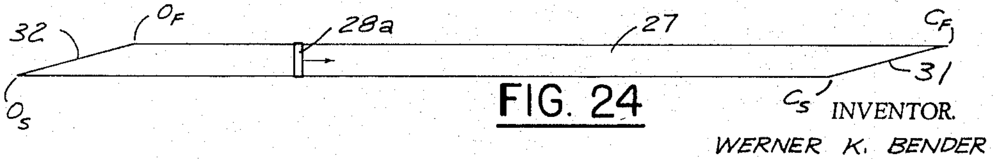
FIG. 24 is a view of the scanning operation of one sound track as related to FIGS. 20–23.

FIGS. 20 through 24 show schematically the rocker assembly 208 in four different operational positions. In FIGS. 21 and 23, and also in FIG. 24, the different opertions are marked as follows:

$O_S$=Opening of shutter starts
$O_F$=Full opening of shutter
$C_S$=Closing of shutter starts
$C_F$=Shutter is fully closed.

The small rectangle 28*a* shown in FIGS. 20 through 24 designates the slot in mask 28.

The shutter blades of the asemblies are designated 235 and 236, respectively. The shutter blades are pivotally supported on spatially movable pivots 237 and 238, respectively. Control arms 239 and 240, respectively, are linked to the shutter blades at 241 and 242, respectively. The locations of the pivot points 241 and 242 are fixed in relation to pivots 237 and 238 but are spatially movable. The two control arms are frictionally guided in bearings 243 and 244, respectively. These bearings may be visualized as stationarily mounted small cases filled with felt or other suitable high friction material.

Starting with FIG. 20, center arm 205 will linearly move in the direction of the straight arrow. As a result, the pivot arm will perform an angular movement in the direction of the curved arrow, and the two pivot points 237 and 238 will be spatially displaced in the direction indicated by the curved arrows and will also be displaced in reference to pivot points 241 and 242. As a result, the two shutter blades will gradually be moved from the position of FIG. 20 into the position of FIG. 21, in which the opening of the right-hand slot by shutter blade 236 just starts. By continuing displacement of pivot arm 205 in the direction indicated in FIGS. 20 and 21, the two shutter blades will finally reach the positions shown in FIG. 22, in which the left-hand slot is fully closed and the right-hand slot is fully opened. As may be observed, this position is the reverse of that shown in FIG. 20. Displacement of pivot arm 205 in the opposite direction, as indicated by the arrows in FIG. 22, causes gradual opening of the left-hand slot and gradual closing of the right-hand slot. FIG. 23 shows the stage in which the opening of the left-hand slot just starts.

In FIG. 11 the general location of the assembly according to FIGS. 18 and 19 is indicated by a dotted area 208.

While the invention has been described in detail with respect to a certain now preferred embodiment and ample of the invention, it will be understood by those skilled in the art, after understanding the invention, that various changes and modifications may be made without departing from the spirit and scope of the invention, and it is intended, therefore, therefore, to cover all such changes and modifications in the appended claims.

What is claimed is:

1. An apparatus for optically recording on a light-sensitized area of a carrier a sound record area in the form of parallel sound track sections, said apparatus comprising rotatable hollow support means for supporting the carrier cylindrically curved in a predetermined position on the support means, first drive means for continuously rotating said support means during recording about the center axis of the cylindrical curvature of the carrier, a stationary light-modulating means for modulating light in accordance with the sound to be recorded, an optical assembly optically disposed to receive light from said light-modulating means and extending into said hollow support means coaxially therewith for directing successive light images corresponding to the received modulated light upon the sensitized carrier area supported on said support means, mounting means supporting said optical assembly lengthwise displaceable along said rotational center axis, and second drive means for continuously displacing said optical assembly during recording along said center axis and in reference to said sensitized carrier area.

2. An apparatus for optically recording on a light-sensitized area of a carrier a sound record area in the form of parallel sound track sections, said apparatus comprising a carrier support assemblage for a carrier to be recorded upon and a recording assemblage for recording light images representing sound upon a light-sensitized area of the carrier, said support assemblage including hollow support means for the carrier, said support means supporting the carrier in a fixed cylindrically curved position and being rotatable about the center axis of the curvature of the carrier, and said recording assemblage including a stationary light-modulating means for modulating light in accordance with the sound to be recorded, an optical assembly disposed to receive light from said light-modulating means and extending into said hollow support means coaxially therewith for directing successive light images corresponding to the received modulated light upon the sensitized carrier area supported by said support means, and mounting means supporting said optical assembly lengthwise displaceable along said center axis, first drive means for continuously rotating said support means during recording about said center axis, and second drive means drivingly coupled with said first drive means for continuously lengthwise displacing said optical assembly while the support means are being rotated by said first drive means, whereby an array of parallel sound track sections is recorded on said sensitized carrier area.

3. An apparatus according to claim 2, wherein said second drive means comprise rotary means drivingly coupled with said first drive means for rotation simultaneously therewith, and motion-translating means coupled with said rotary means and said lengthwise displaceable optical assembly for translating rotation of said rotary means into a corresponding lengthwise displacement of the optical assembly.

4. An apparatus according to claim 3, wherein said motion-translating means comprise a peripherally threaded rotary sleeve mounted coaxially with said optical assembly and drivingly coupled with said first drive means, and a toothed element engageable with the threads of said sleeve and secured to said optical assembly, whereby upon rotation of said sleeve the optical assembly is correspondingly lengthwise displaced.

5. An apparatus according to claim 4, wherein said toothed element is pivotally linked to said optical assembly, and actuating means are provided for pivoting said toothed element into and out of engagement with said threads, said toothed element when in engagement with the threads causing lengthwise displacement of the optical assembly and when withdrawn from the threads freeing the optical assembly for return into an initial position.

6. An apparatus according to claim 2, wherein said recording assemblage comprises obturating means optically coacting with two light paths of said light-modulating means, said obturating means including a pair of spaced-apart shutter elements, shutter-mounting means supporting said shutter elements alternately and gradually movable into and out of said light paths of the light-modulating means, and shutter-actuating means drivingly coupled with said first drive means and said shutter-mounting means for reciprocating said shutter elements alternately into and out of said light paths, whereby each of the recorded track sections is complementarily tapered at each end.

7. An apparatus according to claim 6, wherein the configurations of the shutter elements and the reciprocatory movements thereof in reference to the spatial locations of said light paths are so correlated that one of said elements begins intersection of one light path when the other shutter elements begins withdrawal from another light path.

8. An apparatus for successively recording on a strip of sensitized film several lengthwise spaced sound record areas each in the form of parallel sound track sections, said apparatus comprising a hollow carrier support and guide assemblage for a strip to be recorded upon and a recording assemblage to direct light images representing sound upon a sensitized area of said strip, said support and guide assemblage including support and guide means for supporting the strip lengthwise slidable along a fixed cylindrically curved path and being rotatable about the center axis of the curvature of the strip, and said recording assemblage including light-modulating means for modulating light in accordance with sound to be recorded, an optical assembly disposed to receive light from said light-modulating means and extending into said hollow carrier coaxially with said path for directing successive light images corresponding to the received modulated light upon the sensitized strip area, and mounting means supporting said optical assembly lengthwise displaceable along said rotational center axis, first drive means for continuously rotating said support and guide means during recording about said center axis, second drive means drivingly coupled with said first drive means for continuously lengthwise displacing said optical assembly while the support and guide means are being rotated during recording by the first drive means, whereby an array of parallel track sections is recorded upon said sensitized area of the strip of film, transport means coacting with said support and guide means for lengthwise displacing said strip in said support and guide means to place another sensitized area of the strip into an optically coacting relationship with the optical assembly, and actuating means coacting with said first drive means and said transport means to alternately operate the same for the purposes aforesaid.

9. An apparatus according to claim 8 and comprising a common power drive means for the first drive means, the second drive means and the transport means, and transmission means for selectively coupling the first and second drive means and the transport means to the power drive means.

10. An apparatus according to claim 9, wherein said second drive means comprise rotary means and motion-translating means coupled with said rotary means and said lengthwise displaceable optical assembly for translating rotation of said rotary means into a corresponding lengthwise displacement of the optical assembly, and comprising first transmission means for coupling the common power drive means to the first drive means and said first drive means to the second drive means, second transmission means for coupling the common power drive means to the transport means, and actuating means for selectively rendering operative the first transmission means or the second transmission means.

11. An apparatus according to claim 10, wherein said motion-translating means comprise a peripherally threaded rotary sleeve mounted coaxially with said optical assembly and drivingly coupled with said first drive means, and a toothed element engageable with the threads of said sleeve and secured to said optical assembly, whereby upon rotation of said sleeve by the first drive means the optical assembly is correspondingly lengthwise displaced.

12. An apparatus according to claim 11, wherein said toothed element is pivotally linked to said optical assembly, and comprising actuating means for pivoting said toothed element into and out of engagement with the threads of said sleeve, said toothed element when engaged with the threads causing lengthwise displacement of the optical assembly and when withdrawn from the threads freeing the optical assembly for return into an initial position.

13. An apparatus according to claim 8, wherein said recording assemblage comprises obturating means optically coacting with two light paths of said light-modulating means, said obturating means including a pair of spaced-apart shutter elements, shutter-mounting means supporting said shutter elements alternately and gradually movable into and out of said light paths of said light-modulating means, and shutter-actuating means drivingly coupled with said first drive means and said shutter-mounting means for reciprocating said shutter elements alternately into and out of said light paths, whereby each of the recorded sound track sections is complementarily tapered at each end.

14. An apparatus according to claim 2, wherein said carrier support assemblage comprises a rotary flywheel disk supporting thereon said support means, and wherein said first drive means comprise a constant speed motor and rotation-transmitting means for frictionally coupling said motor with the peripheral rim of said disk to drive the latter.

15. An apparatus according to claim 14, wherein said flywheel disk has a central aperture, said optical assembly slidably protruding through said aperture into optical coaction with the carrier supported on said support means.

16. An apparatus according to claim 2, wherein said light-modulating means comprise a recorder lamp, first light-deviating means disposed on opposite sides of said lamp to receive light therefrom, a galvanometer having an oscillating mirror adapted to be oscillated in accordance with the sound to be recorded, optical beam-merging means, each of said first light-deviating means deflecting a beam of light upon the optical beam-merging means and said beam-merging means directing the composite light upon said mirror, and wherein said optical assembly comprises a recording lens optically disposed to receive light reflected by said mirror and to direct the received light upon the sensitized area of the carrier.

17. An apparatus according to claim 16, wherein second light-deviating means are optically interposed between said galvanometer mirror and said recording lens to direct light reflected by the mirror upon the recording lens.

18. An apparatus according to claim 16, wherein a stationarily mounted slotted modulating mask is interposed between said beam-merging means and said galvanometer mirror.

19. An apparatus according to claim 18, wherein said recorder lamp has a ribbon-shaped filament.

20. An apparatus according to claim 16, wherein a movable shutter means is optically interposed between each of said first light-deviating means and said galvanometer mirror, and actuating means driven by said first drive means move said shutter means alternately into and out of a light-intersecting position, and wherein a further light-deviating means is optically disposed to receive the modulated merged light from said recording lens and to direct the light upon the sensitized area of the carrier.

21. An apparatus according to claim 20, wherein a slotted mask is interposed in the path of each of said beams of light for shaping said beams prior to impinging upon said beam-merging means.

22. An apparatus according to claim 2, wherein said light-modulating means comprise a recorder lamp having a ribbon-shaped filament, a first pair of light-deviating means disposed on opposite sides of said lamp, each deflecting light received from said lamp, a pair of condenser lenses to condense light deflected by said light-deviating means into two beams of light, a pair of movable shutter means, actuating means driven by said first drive means for alternately moving said shutter means into and out of beam-intersecting positions, a slotted mask interposed in the path of each of said beams to shape the same, optical beam-merging means, a projecting lens interposed in the path of each of said shaped beams for directing the respective beam upon said beam-merging means, galvanometer means having an oscillating mirror adapted to be oscillated in accordance with the sound to be recorded, said beam-merging means directing the merged light upon said mirror, a modulating mask and a condenser lens interposed in the path of light between said beam-merging means and said mirror, and second light-deviating means directing modulated light reflected by said motor to said optical assembly, said optical assembly including a recorder lens optically positioned to receive light from said second light-deviating means and to direct said light upon the sensitized area of the carrier.

References Cited

UNITED STATES PATENTS

| | | | |
|---|---|---|---|
| 3,051,042 | 8/1962 | Maurer | 88—24 |
| 3,001,030 | 10/1961 | Maurer | 179—100.3 |
| 2,516,718 | 7/1950 | Oriol | 95—1.1 |
| 2,189,311 | 2/1940 | Dimmick | 171—95 |
| 3,108,160 | 10/1963 | Maurer | 179—100.3 |

FOREIGN PATENTS

| | | |
|---|---|---|
| 646,185 | 11/1950 | Great Britain. |

TERRELL W. FEARS, *Primary Examiner.*

IRVING L. SRAGOW, *Examiner.*

R. F. CARDILLO, A. F. BERNARD, *Assistant Examiners.*